C. H. SPERLE.
INCUBATOR BROODER.
APPLICATION FILED OCT. 14, 1915.

1,211,977.

Patented Jan. 9, 1917.
2 SHEETS—SHEET 1.

WITNESSES

INVENTOR
Charles H. Sperle
BY
ATTORNEYS

C. H. SPERLE.
INCUBATOR BROODER.
APPLICATION FILED OCT. 14, 1915.
1,211,977.
Patented Jan. 9, 1917.
2 SHEETS—SHEET 2.
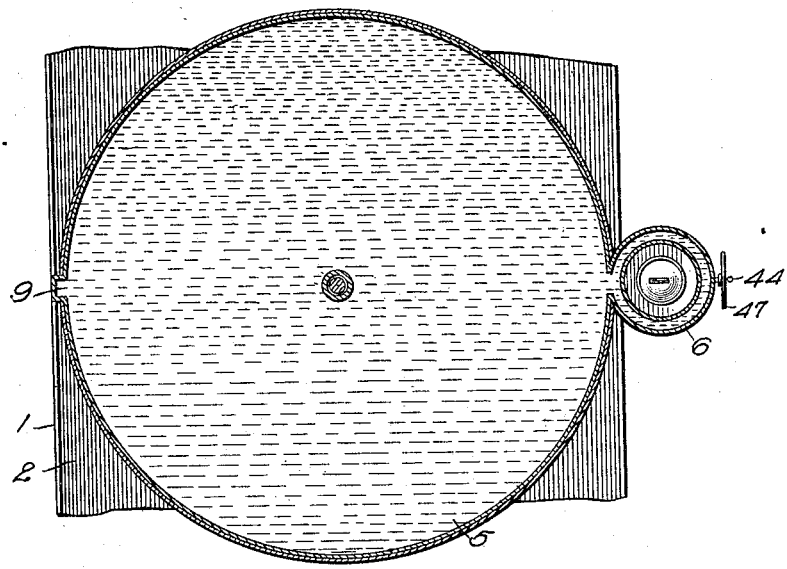
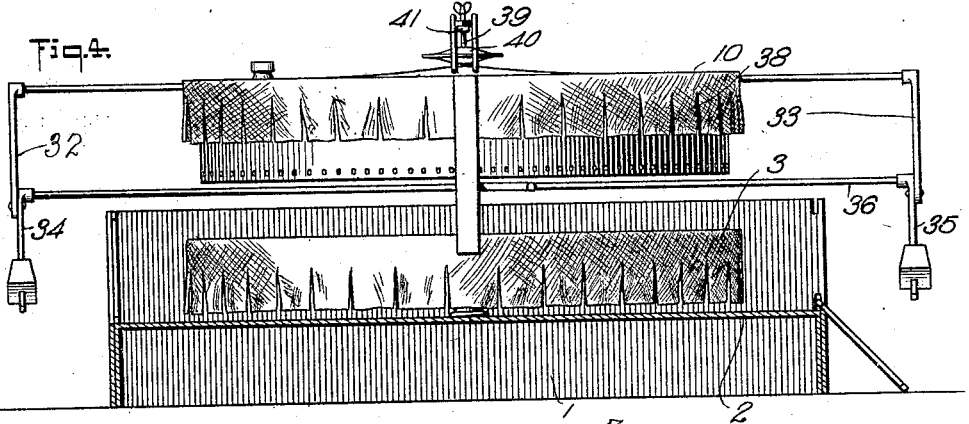
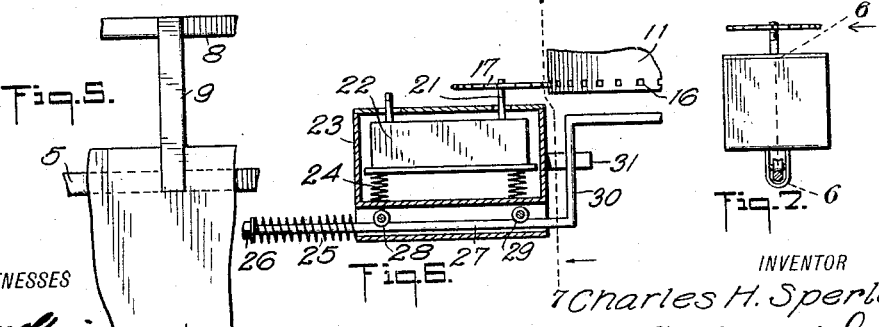
WITNESSES
INVENTOR
Charles H. Sperle
BY
ATTORNEYS

UNITED STATES PATENT OFFICE.

CHARLES HENRY SPERLE, OF SOMERVILLE, NEW JERSEY.

INCUBATOR-BROODER.

1,211,977.   Specification of Letters Patent.   Patented Jan. 9, 1917.

Application filed October 14, 1915. Serial No. 55,819.

*To all whom it may concern:*

Be it known that I, CHARLES H. SPERLE, a citizen of the United States, and a resident of Somerville, in the county of Somerset and State of New Jersey, have invented a new and Improved Incubator-Brooder, of which the following is a full, clear, and exact description.

This invention relates to combined incubators and brooders and has for an object the provision of an improved construction and arrangement of parts whereby the eggs are acted upon under as nearly actual natural conditions as is possible by mechanical construction.

An object in view is to produce an improved simplified construction which will imitate nature as far as possible in order to secure healthy strong fowl.

A further object in view is to provide a device formed with an incubating structure whereby the eggs are maintained at a substantially even temperature except at one point, which is raised slightly in temperature.

A still further object in view is to provide an incubating construction whereby the eggs are provided with a free circulation of air without a draft and are rolled over while in contact with the heating medium and a support for imitating the action of the rolling eggs in a natural nest.

A still further object in view is to provide a combined incubator and brooder which will provide a heating member continually in contact with the eggs and also a heating member continually in contact with the chicks for presenting a condition as nearly similar to nature as possible.

Figure 1:
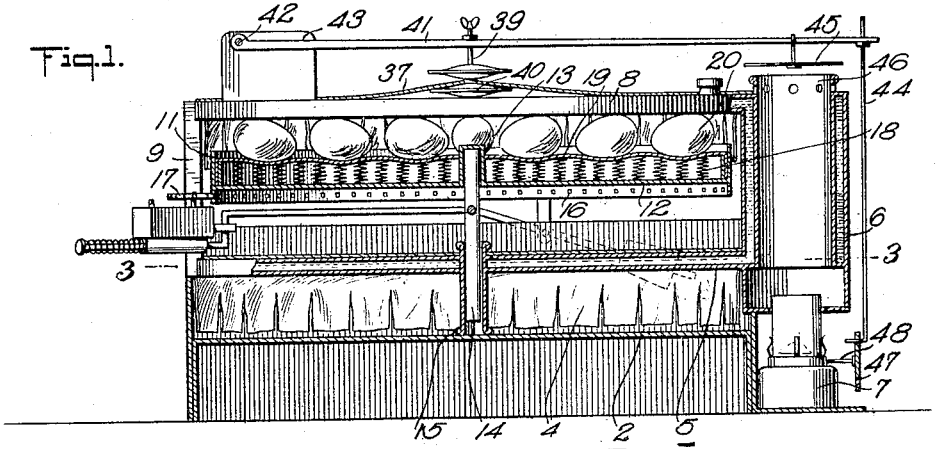
Figure 2:
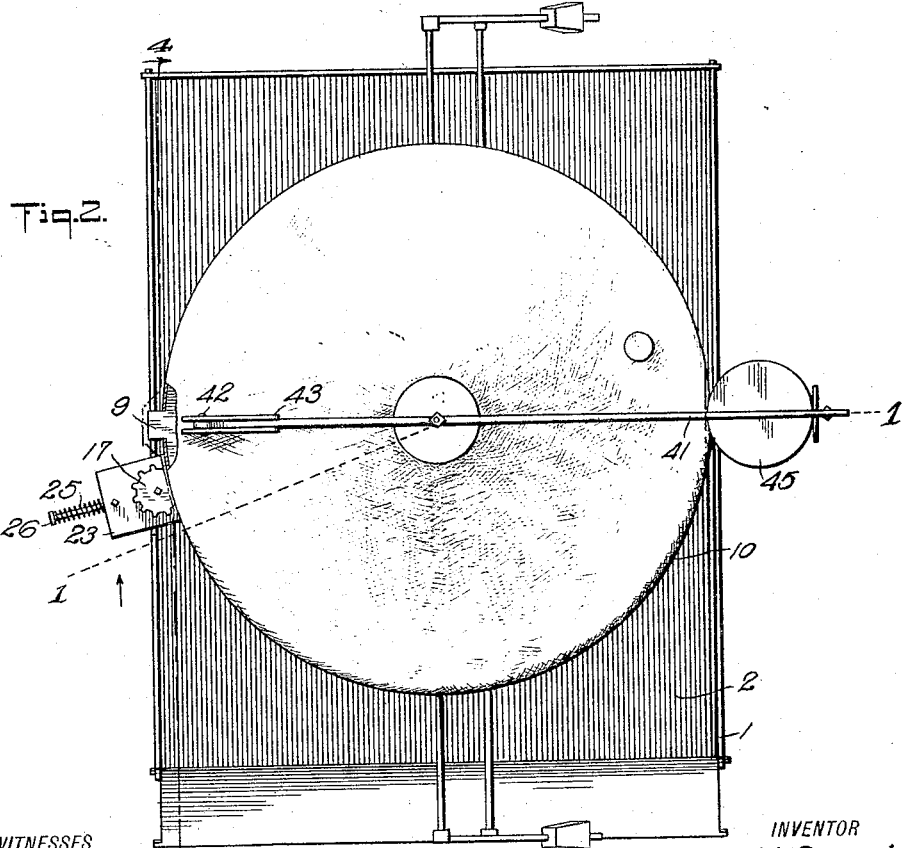

In the accompanying drawings: Figure 1 is a longitudinal vertical section through an incubator brooder embodying the invention on line 1—1 of Fig. 2; Fig. 2 is a top plan view of the structure shown in Fig. 1; Fig. 3 is a section through Fig. 1 on line 3—3; Fig. 4 is a section through Fig. 2 on line 4—4; Fig. 5 is a fragmentary edge view showing one of the supporting water conduits; Fig. 6 is a longitudinal vertical section through a clock framework and associated parts embodying certain features of the invention, the same being approximately on line 6—6 of Fig. 7; Fig. 7 is a section through Fig. 6 on line 7—7.

Referring to the accompanying drawings by numerals, 1 indicates a housing or box provided with a platform or bottom 2 spaced preferably a short distance above the bottom of the housing 1, as shown in Fig. 4. The housing 1 may be rectangular, as shown in Fig. 2, or any other suitable shape desired without departing from the spirit of the invention. It will be observed that the platform or flooring 2 is the floor on which the chicks are grouped immediately after the hatching as part of the same forms the bottom of the brooding structure 3. The brooding structure 3 comprises the bottom 2, a slitted cloth protecting member 4 and a tank or compartment 5 for receiving warm water. The bottom of the tank 5 is preferably spaced from floor 2 a distance slightly less than the height of an ordinary naturally hatched chick so that when the chicks pass through the fabric 4 beneath tank 5 their backs will contact with the tank 5 and consequently receive heat directly therefrom as well as from the surrounding atmosphere. The contact with tank 5 is intended to give the same effect as the contact of a chick against a hen, while the surrounding atmosphere is warmed so as to give the usual warmth retained by the feathers of a hen.

The tank 5 forming part of the brooder 3 is in free communication with the jacket 6 associated with the burner 7 so that water may freely pass from jacket 6 to the tank 5. The upper tank or compartment 8 is preferably formed round but may be any other suitable shape, said upper compartment being in communication with the compartment or tank 5 and jacket 6 and also with a return pipe 9 arranged opposite jacket 6 whereby the circulation of the water will maintain a substantially even heat in the incubator 10 as well as in the brooder 3. Incubator 10 is provided with a water compartment 8 and also with a ring or inclosing wall 11 provided with a bottom 12, which bottom is rigidly secured to the ring 11 in any suitable manner and which is provided with a socket member 13 for receiving the upper end of post 14. Post 14 at the lower end fits into a tube 15 which tube is rigidly secured to the tank or compartment 5, as shown in Fig. 1, and is adapted to rest on the floor 2 so as to assist in supporting tank or compartment 5 and associated parts. In Fig. 1 it will be observed that part of the jacket 6 and the return pipe 9 rest on part of the housing 1 so that the parts are properly supported.

The ring 11 is provided with a plurality of equally spaced apertures 16 adapted to receive the teeth of a sprocket wheel 17 for purposes hereinafter fully described.

Arranged on the bottom 12 are a plurality of springs 18 which support a fabric covering member 19. The eggs 20 are placed on the fabric 19 and slightly compress the springs so that the springs will give a continuous tendency to the fabric covering 19 whereby the same will cause the eggs to be pressed lightly against the wall of the compartment or tank 8. As the heated water passes through the compartment 8 the same will naturally heat the atmosphere below the compartment but will heat to a slightly greater extent that portion of the respective eggs which contacts with the bottom 6 of the compartment. This contact is desirable in that it follows a law of nature, for when a hen sets on a nest full of eggs only part of each egg will contact with the hen and be heated to a greater extent than the remaining part. This together with other reasons necessitates the turning over of the eggs, which turning over should be accompanied with some slight jars in order in a certain sense to exercise the embryo and thereby produce a stronger, healthier chick.

In order to produce this slight jarring or exercising action the ring 11 and parts associated therewith are rotated by wheel 17, said wheel moving intermittently by the operation of a clockwork which clockwork is set in motion at stated intervals. As the ring 11 and associated parts rotate the same will carry with them the eggs 20 and the eggs are not only turned over by this rotation but the friction of the eggs against the compartment 8 and the cloth covering 19 will produce the exercising found desirable in hatching strong healthy chicks. The wheel 17 is connected to the striking shaft 21 of the clock 22 of any suitable construction. As is well known, the striking shaft of a clock is operated at stated intervals, as for instance, at intervals of one hour, said operation being longer or shorter according to the time of day. An ordinary striking mechanism may be used or a similar mechanism may be used in which the shaft 21 is operated or rotated the same number of times on each release, if preferred, in order to give the same amount of rotation each time. It is aimed to only turn the eggs for a part of a complete revolution upon each movement of the wheel 17, the aggregate of the turning movement of the eggs being but one revolution in twenty-four hours.

The clock 22 is preferably arranged in casing 23 and is also preferably supported by springs 24 so as to allow a slight up and down movement and thereby hold the wheel 17 continually in mesh with the apertures in ring 11. In order that the wheel 17 may be positively prevented from moving away from the ring 11 a spring 25 bears against casing 23 and against a stop 26 on rod 27, which rod is engaged by rollers 28 and 29 supported by casing 23. Rod 27 is bent so as to be provided with a vertical section 30 which extends between the guiding ears 31 whereby there can be no rotary movement of casing 23. From section 30 the rod 27 extends to the shaft 14 to which it is rigidly secured in any suitable manner, whereby it will be seen that by the use of this rod and spring 25 the wheel 17 is resiliently pressed against ring 11.

In order to maintain a substantially even pressure on the eggs 20 a pair of brackets 32 and 33 (Fig. 4) are rigidly connected to the walls of the compartment 8 in any suitable manner and pivotally connected with arms 34 and 35, which arms are rigidly secured to a central shaft 36 passing through the shaft 14. Suitable weights which may be adjustable, if desired, are mounted on the arms 34 and 35, whereby a continuous even pressure is exerted on the eggs as they are rolled as well as when they remain stationary, thus producing a desired jarring for the purpose above described.

The incubator 10 is covered with a fabric covering 37 which has a turnedover portion 38 slit at intervals as shown in Fig. 4, whereby ample air is permitted to circulate around the eggs but no draft is permitted. A thermostat 39 is mounted on the incubator and arranged so that one of the pairs of diaphragms 40 will be beneath the covering fabric 37 while the remaining pair of diaphragms will be outside of the covering fabric 37. The shaft extending from the diaphragms 40 is connected with an arm 41 pivotally mounted at 42 between suitable uprights 43 and arranged so that the free end will be engaged by rod 44. The free end of the arm 41 carries a damper 45 so as to close the chimney or draft member 46 when it is desired to retain some additional heat. The rod 44 engages one of the apertures in wheel 47, which wheel is connected to the shaft 48 of the operating mechanism of the lamp 7, whereby as the rod 44 and arm 41 will move up and down the wick will be turned up and down so as to supply more or less heat. Any desired number of apertures may be provided in wheel 47 so as to give the proper regulation to the various parts after the lamp has been in operation some little time.

In using the incubator brooder the parts are arranged as shown in Fig. 1 with the eggs in position, together with the clockwork 22 and lamp 7. The clock 22 intermittently moves the ring 11 and associated parts so as to rotate the eggs. After the usual time for incubation has passed the eggs will begin to hatch and the chicks will naturally fall off of the fabric supporting member 19 on to floor 2. Floor 2 will act as a runway for the chicks and also as a brooder, the brooder part being that part which is inclosed by the fabric 4. By this construction and arrangement the chick may pass his head through one of the slits in the fabric 4 while leaving his body within the covering fabric, or may pass in and out as desired.

What I claim is:—

1. A combined incubator and brooder comprising an incubator construction provided with yieldable curtain walls, whereby the chicks may pass from the incubator to a floor below the incubator for receiving said chicks, a hot water tank spaced above said floor approximately the height of a chick so that when a chick moves to a position beneath the floor it will contact with the tank for receiving heat directly therefrom, and a curtain covering arranged around the periphery of said hot water tank and substantially reaching said floor.

2. A combination incubator and brooder comprising a pair of water tanks, one tank being for the brooder and one for the incubator, a single heating means for supplying heated water to said tanks, means for supporting eggs so as to contact with the upper hot water tank, a fabric covering for the lower heating tank, said fabric covering having an overhanging edge provided with slits, and a flooring arranged below said lower tank, said flooring being adapted to receive the chicks as the same fall from said incubator, said flooring also acting as the bottom of the floor of the brooder inclosed by said fabric covering.

3. An incubator having a warm water tank, an egg tray, resilient means on said tray for resiliently pressing the eggs in the tray against said tank, a lever connected with said tray and a weight connected to said lever acting thereon for causing the lever to give a continual even pressure on said eggs at all times.

4. A combined incubator and brooder, comprising an upper and a lower hot water tank, an upper and a lower floor for supporting eggs and chicks, respectively, said lower floor being stationary and said upper floor being rotatable, a supporting journal for said upper floor, a lever connected with said journal, a weight acting on said lever for raising the journal so that the floor will be given a tendency to move upwardly and press said eggs against said upper hot water tank, and means for guiding said journal.

In testimony whereof I have signed my name to this specification in the presence of two subscribing witnesses.

CHARLES HENRY SPERLE.

Witnesses:
 VORHEES KLINE,
 SAMUEL P. SUTPHEN.

Copies of this patent may be obtained for five cents each, by addressing the "Commissioner of Patents, Washington, D. C."